US012276127B2

(12) United States Patent
Lo

(10) Patent No.: US 12,276,127 B2
(45) Date of Patent: Apr. 15, 2025

(54) POSITIONING DEVICE FOR FENCE SUPPLEMENTED WITH PET GUARDRAIL

(71) Applicant: Xia Shin International Co., Ltd., Tainan (TW)

(72) Inventor: Eric Chen Zer Lo, Tainan (TW)

(73) Assignee: Xia Shin International Co., Ltd., Tainan (TW)

( * ) Notice: Subject to any disclaimer, the term of this patent is extended or adjusted under 35 U.S.C. 154(b) by 467 days.

(21) Appl. No.: 17/955,808

(22) Filed: Sep. 29, 2022

(65) Prior Publication Data

US 2023/0184004 A1 Jun. 15, 2023

Related U.S. Application Data

(63) Continuation-in-part of application No. 17/558,822, filed on Dec. 22, 2021, now Pat. No. 11,746,558.

(30) Foreign Application Priority Data

Dec. 9, 2021 (TW) ................................ 110146077
Sep. 8, 2022 (TW) ................................ 111134163

(51) Int. Cl.
*E04H 17/14* (2006.01)
*E06B 11/02* (2006.01)

(52) U.S. Cl.
CPC ..... *E04H 17/1448* (2021.01); *E04H 17/1439* (2013.01); *E06B 11/025* (2013.01)

(58) Field of Classification Search
USPC .................................. 256/24, 32, 33, 47, 54
See application file for complete search history.

(56) References Cited

U.S. PATENT DOCUMENTS 888,905 A 5/1908 Johnson
1,182,018 A * 5/1916 Koenig .................... A01K 3/00
256/25

(Continued)

FOREIGN PATENT DOCUMENTS

CN 212937287 U 4/2021
JP 2019030243 A 2/2019

OTHER PUBLICATIONS

Taiwan Intellectual Property Office, Decision to Grant a Patent, Apr. 24, 2023, 2 pages (with 1 page English translation).

*Primary Examiner* — Daniel J Wiley
(74) *Attorney, Agent, or Firm* — Best & Flanagan LLP

(57) ABSTRACT

A positioning device for fence supplemented with pet guardrail comprises: an upper embedding slot and a lower embedding slot having face-to-face openings and extending axially being respectively formed on an opposite outside of the upper crossbar and the lower crossbar of the pet guardrail, for embedding the upper and lower ends of the straight rod and fixing the straight rod via the positioning peg from the inner side of the upper crossbar and the lower crossbar to avoid the exposure of the positioning peg and omitting the installation of the front cover plate on the front side of the upper crossbar and the lower crossbar, and moreover, the side cover installed and covered on the left and right ends of the upper crossbar and the side cover facing the end of side pole of the existing fence being an circular arc surface, thereby meeting the installation inclination angle of the existing fence. The configuration of the circular arc surface enables the side cover to maintain attached with the side pole.

4 Claims, 8 Drawing Sheets

(56) References Cited

U.S. PATENT DOCUMENTS

| | | | | |
|---|---|---|---|---|
| 1,211,059 | A | 1/1917 | Blank | |
| 1,312,242 | A | 8/1919 | Ferris | |
| 1,386,928 | A | 8/1921 | Hamilton | |
| 1,445,307 | A | 2/1923 | Ferris | |
| 1,764,284 | A | 6/1930 | Barton | |
| 5,076,545 | A * | 12/1991 | Bodzin | E04F 11/1851 256/29 |
| 6,832,752 | B2 | 12/2004 | Cuzzocrea | |
| 10,787,838 | B2 | 9/2020 | Larsen | |
| 2016/0208515 | A1 | 7/2016 | Larsen | |
| 2021/0010290 | A1 | 1/2021 | Larsen | |

* cited by examiner

C-C

D-D

POSITIONING DEVICE FOR FENCE SUPPLEMENTED WITH PET GUARDRAIL

BACKGROUND OF THE INVENTION

Field of the Invention

The present invention is related to a positioning device for fence supplemented with pet guardrail, and more particularly to a device enabled to omit the front cover plate installed at the front side of the upper crossbar and lower crossbar of the pet guardrail and the side cover individually installed to cover the right and left sides of the upper crossbar and lower crossbar, thereby matching the setting inclination angle of the existing fence and maintaining fit and connect between the side cover and the side pole of the existing fence.

Description of the Related Art

In order to prevent people from entering for no good reason, fences are set up around the garden of a house. If the gap between the horizontal or vertical rods of the fences are too large, the pets will easily run out of the garden to the road and further cause the risk of collision while the vehicles pass. Therefore, in order to prevent the pets from running out of the garden, some people will supplement pet guardrails on the bottom sides of the existing fences so that to reduce the gap distance of the existing fences. The supplementary pet guardrails have been disclosed in the following U.S. Pat. Nos. 10,787,838, 6,832,752, 1,764,284, 1,445,307, 1,386,928, 1,312,242, 1,211,059 and 888,905.

Regarding the earlier application (first application) of the present invention, the applicant has corresponding applications file with USPTO and TIPO, wherein the Taiwan Patent application (Application No. 110146077) has been allowed and granted a Patent and the U.S. Patent application (application Ser. No. 17/558,822) is still under examination. In the first application, the each connecting point of the upper crossbar, lower crossbar and each straight rod of the pet guardrail is fixed by a positioning peg, and to avoid poor appearance or potential hurt to the pets due to the exposure of the plurality of positioning pegs, an upper front cover plate and a lower front cover plate are respectively fixed on the outside of the positioning peg of the upper crossbar and the lower crossbar to cover the positioning pegs. The configuration of the upper and lower front cover plates increases the production cost. Moreover, the side covers are installed on the left and right ends of the upper crossbar and lower crossbar, and in the first application, the side cover facing the side pole end of the existing fence is a vertical surface. When the installing inclination angle of the vertical surface on the existing fence is too large, the vertical position of the side cover will usually collide with the side wall of the vertically disposed side pole and obstruct the installation of the pet guardrail.

In view of the above problem of the first patent in actual applications, the inventor of the present invention made improvements to the design and developed the present invention.

SUMMARY OF THE INVENTION

The primary object of the invention is to provide a pet guardrail omitting the installation of the upper and lower front cover plates on the pet guardrail and a side cover without being restricted by the installation angle of the existing fence.

The main feature of the present invention is that an opposite outside of the upper crossbar and the lower crossbar on the pet guardrail are respectively configured with an upper embedding slot and a lower embedding slot comprising openings facing each other and extending axially, thereby embedding the upper and lower ends of the vertical bars, and fixing with the vertical bar from the inner side of the upper crossbar and the lower crossbar via the positioning peg to avoid the exposure of the positioning peg and omit the installation of the front cover plate on the front side of the upper crossbar and the lower cross bar.

The other feature of the present invention is that the side cover is installed to cover the left and right ends of the upper crossbar and lower crossbar, wherein the side cover facing the side pole end of the existing fence is an arc surface and thereby matching the installing inclination angle of the existing fence and enabling the side cover to maintain connected with the side pole through the configuration of the arc surface.

The structure and function of the present invention are described in detail below with respect to a preferred embodiment and with reference to the accompanying drawings.

DETAILED DESCRIPTION OF THE PREFERRED EMBODIMENTS

Figure 1:
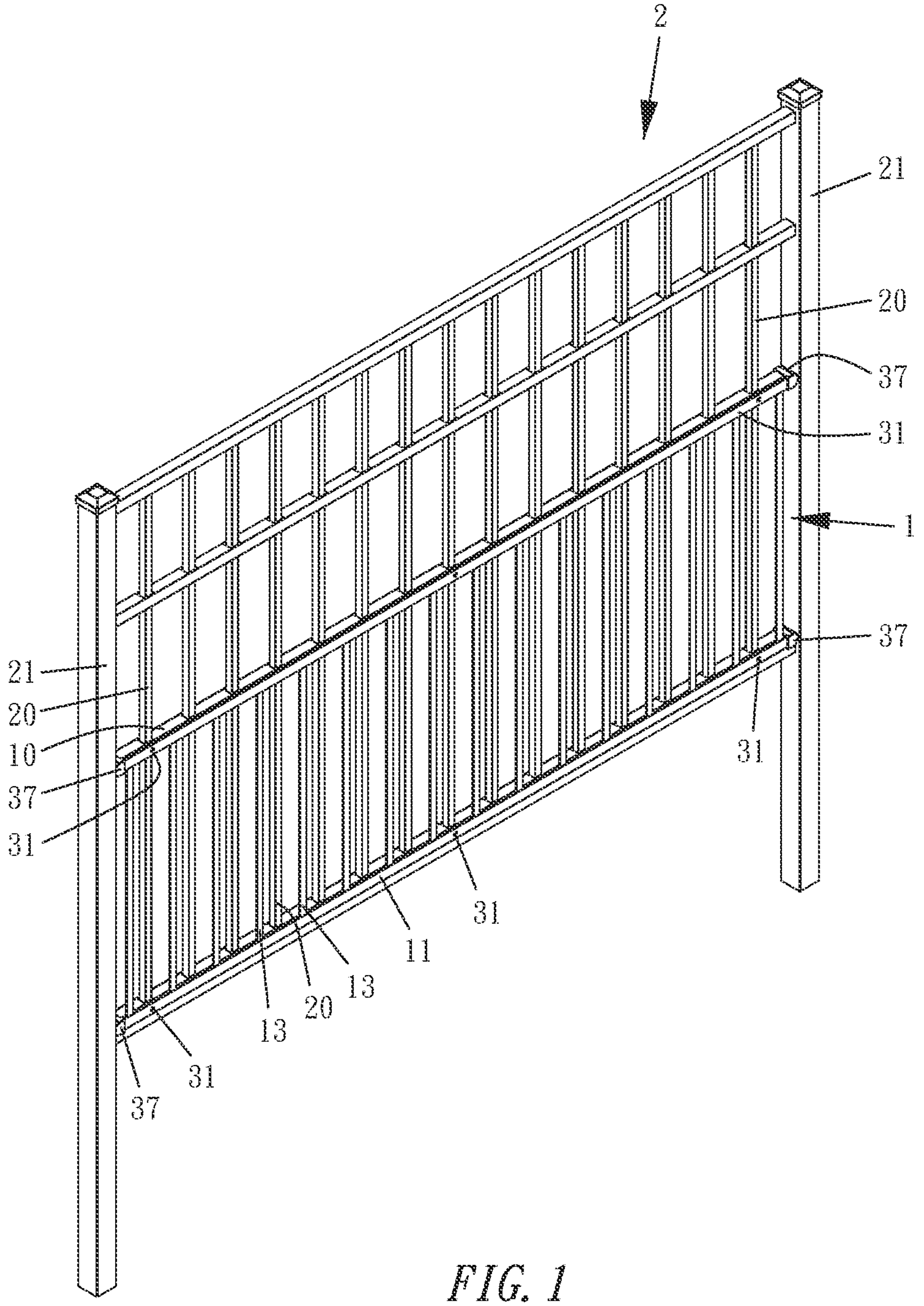
FIG. 1 is an assembled perspective view of the pet guardrail according to embodiment of the present invention attached to an existing fence.
Figure 2:
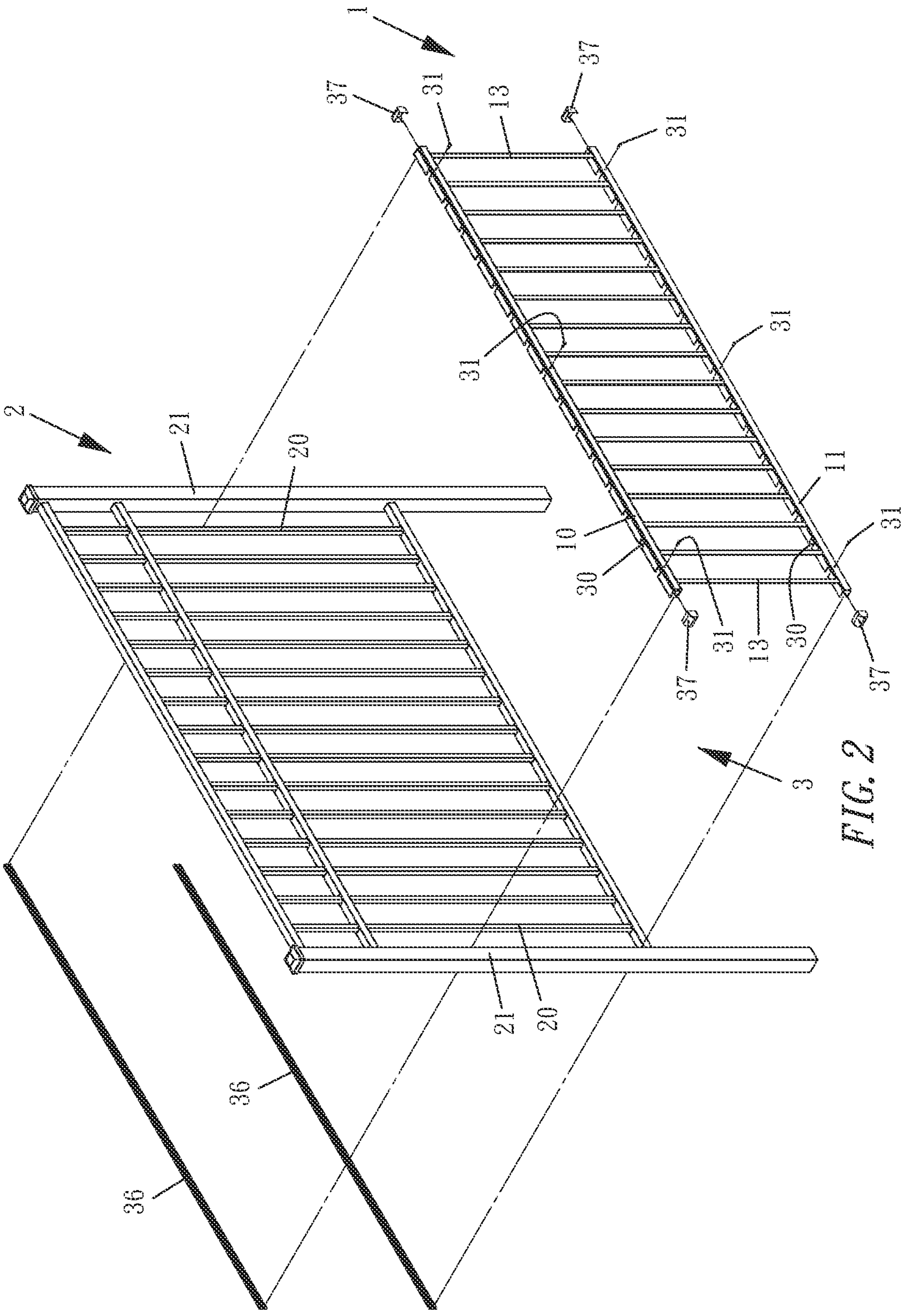
FIG. 2 is an exploded perspective view of the embodiment of the present invention.
Figure 3A:
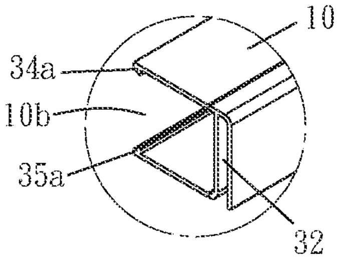
FIGS. 3*a*, 3*b*, 3*c*, 3*d* are respectively enlarged views of a, b, c, d parts in FIG. 3.
Figure 3B:
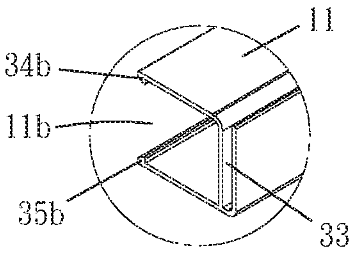
Figure 3C:
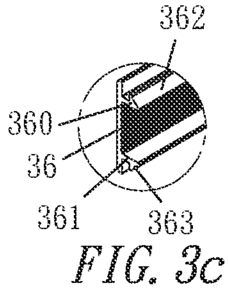
Figure 3:
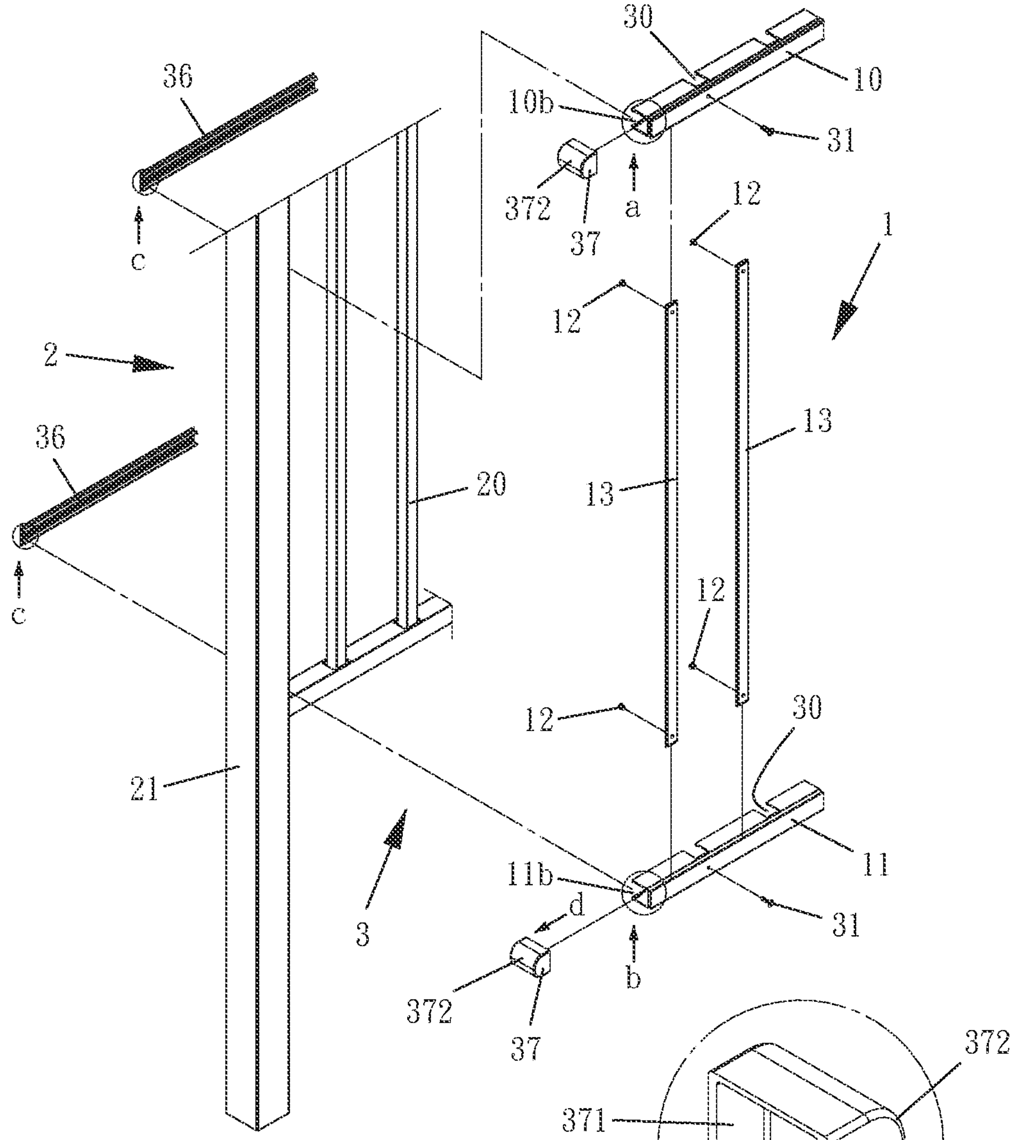
FIG. 3 is a partially enlarged view of the embodiment of the present invention.

With reference to FIGS. 1-4, the pet guardrail 1 of the present invention is fixed under one side of an existing fence 2 by means of lateral attachment and embedding. The structure of the pet guardrail 1 is at least composed of an upper crossbar 10, a lower crossbar 11 arranged horizontally and a plurality of straight rods 13 fixed by the positioning pegs 12 (as shown in FIG. 3, such as bolts or rivets) to connect between the upper crossbar 10 and lower crossbar 11 (as show in FIG. 2). When the pet guardrail 1 is fixed on the existing fence 2, each straight rod 13 is inserted between two vertical bars 20 corresponding to the existing fence 2 to reduce the distance between two vertical bars 20 of the existing fence 2.

The positioning device 3 thereof comprises the upper crossbar 10 and lower crossbar 11 facing the side of the vertical bar 20 on the existing fence 2 are configured with an embedding notches 30 having an inner concave shape for embedding the vertical bars 20 and fixed with the vertical bars 20 through the fastening bolts 31 (such as screw bolts). An upper embedding slot 32 and a lower embedding slot 33 (as shown in FIG. 3*a*, FIG. 3*b*) having the face-to-face opening and extending axially are respectively formed on the outside corresponding to the upper crossbar 10 and the lower crossbar 11 for embedding the upper and lower ends of the vertical bars 13, and fixed with the straight rod 13 via the said positioning peg 12 penetrating transversely from the inner side of the upper crossbar 10 and the lower crossbar 11. The upper crossbar 10 and lower crossbar 11 facing the rear sides of the existing fence 2 comprises an a lateral opening 10*b*, 11*b* with an open shape, wherein the opposite inner wall of the top end and bottom end of the lateral openings 10*b*, 11*b* respectively protruded with an upper engaging teeth 34*a*, 34*b* and a lower engaging teeth 35*a*, 35*b* (as shown in FIG. 3*a*, FIG. 3*b*) extending axially.

Figure 4:
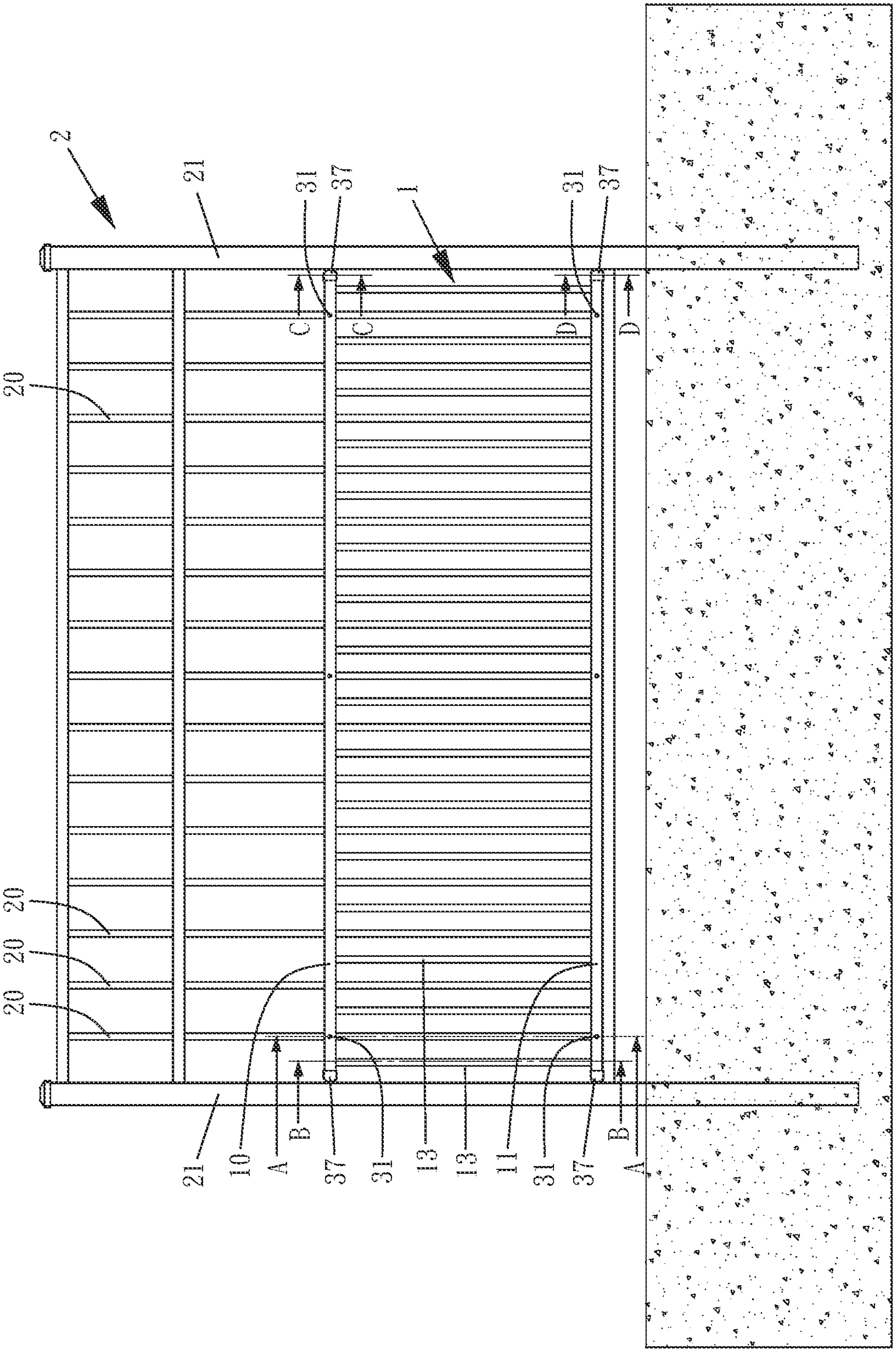
FIG. 4 is a front view of the installation state of the embodiment of the present invention.
Figure 5:
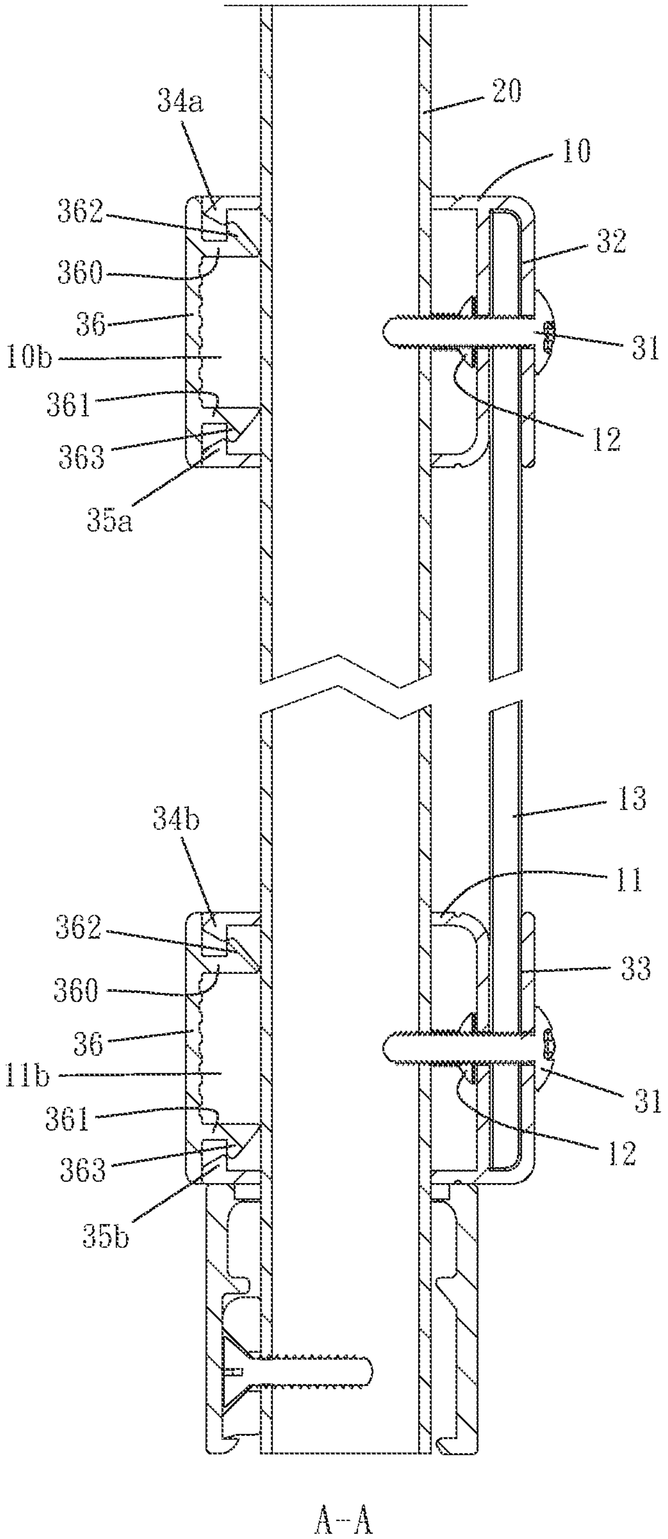
FIG. 5 is an enlarged sectional view of A-A segment in FIG. 4.
Figure 6:
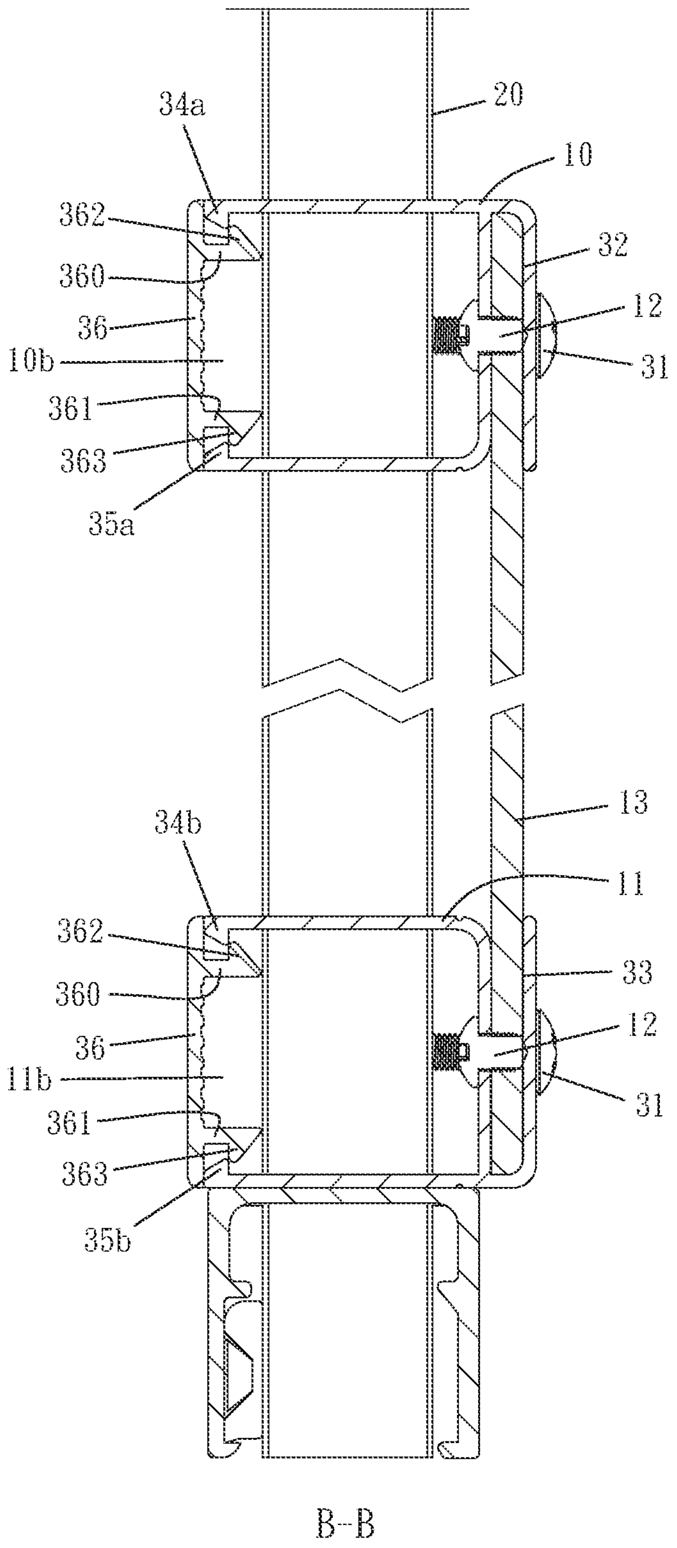
FIG. 6 is an enlarged sectional view of B-B segment in FIG. 4.

A rear cover plate 36 is installed on the lateral openings 10*b*, 11*b* of the upper crossbar 10 and lower crossbar 11. The upper and lower sides of the rear cover plate 36 facing the lateral opening 10*b*, 11*b* comprise an upper wing plate 360 and a lower wing plate 361 arranged up and down (as shown in FIG. 4) respectively extending horizontally toward the upper crossbar 10 and the lower cross bar 11 and the extending ends of the upper wing plate 360 and lower wing plate 361 are respectively configured with an upper engaging lip 362 and a lower engaging lip 363 (as shown in FIG. 3, FIG. 3*c*) facing opposite directions, and when the rear cover plate 36 covers the lateral openings 10*b*, 11*b*, the upper engaging lip 362 and the lower engaging lip 363 are respectively clamped with the upper engaging teeth 34*a*, 34*b* and the lower engaging teeth 35*a*, 35*b* (as shown in FIG. 5 and FIG. 6) so that the lateral openings 10*b*, 11*b* are covered by the rear cover plate 36 to avoid exposure.

Figure 3D:
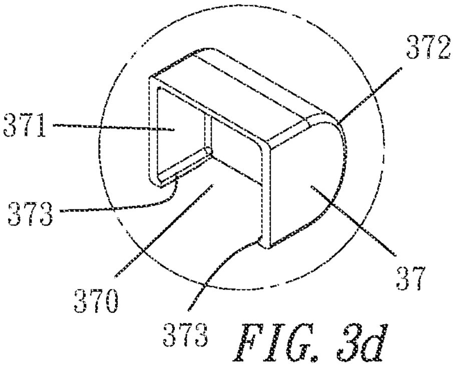
Figure 7:
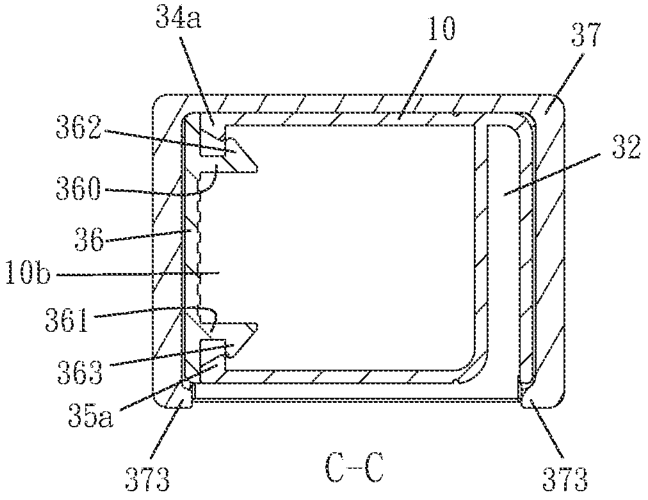
FIG. 7 is an enlarged sectional view of C-C segment in FIG. 4.
Figure 8:
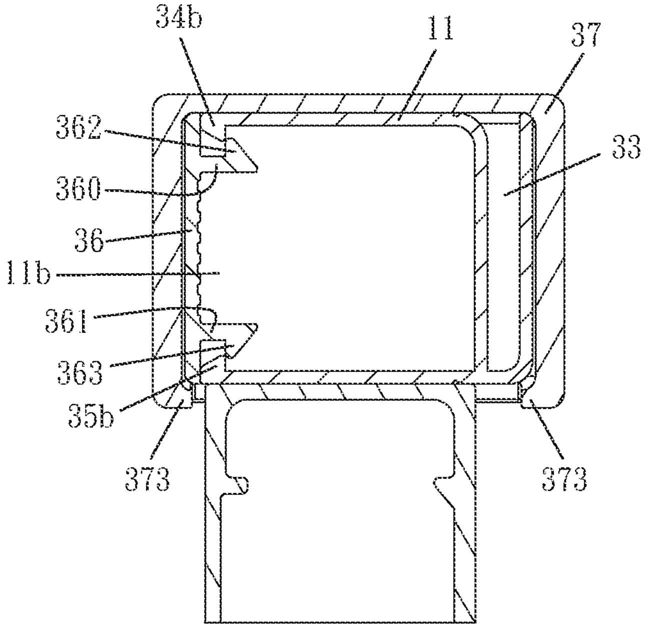
FIG. 8 is an enlarged sectional view of D-D segment in FIG. 4.
Figure 9:
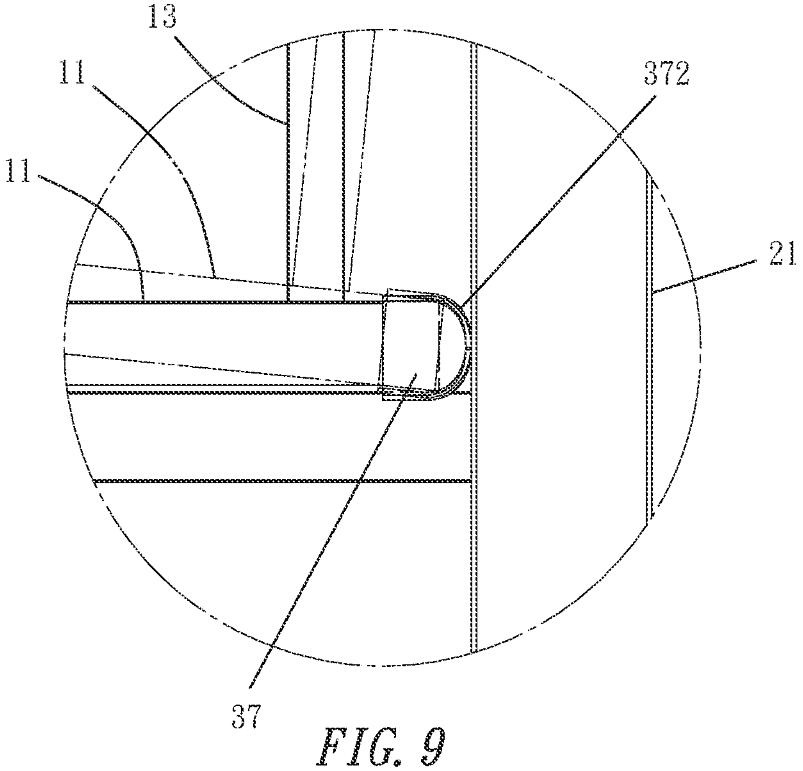
FIG. 9 is an application reference view of the side cap in the embodiment of the present invention.

A side cover 37 (as shown in FIG. 3*d*) is installed on the left and right ends of the upper crossbar 10 and the lower crossbar 11 combined with the rear cover plate 36. The bottom end of the side cover 37 comprises a lower opening 370 with the side opening 370 on one side, and the opposite end (that is, facing the side pole 21 end) of the side cover 37 on the side opening 371 is an circular arc surface 372. The bottom ends of the front and rear ends of the lower opening 370 are respectively folded toward the inside of the lower opening 370 to form a lower hook 373 to enable the rear cover plate 36 to be fixed on the upper crossbar 10 and lower crossbar 11 and then the side cover 37 can be from up to down sheathed on the outside of the right and left ends of the upper crossbar 10 and lower crossbar 11. Further, through the lower hook 373, the side cover 37 is engaged and fixed with the bottom face combined with the rear cover plate 36, the upper crossbar 10 and the lower crossbar 11 (as shown in FIG. 7 and FIG. 8) and thereby to prevent the sharp ends of the upper crossbar 10, the lower crossbar 11 and the rear cover plate 36 from hurting people or pets. The circular arc surface 372 of the side cover 37 faces the side pole 21 of the existing fence 2 and contacts with the side pole 21. Thus, the pet guardrail 1 can match the installation inclination of the existing fence 2 due to topographic influences, maintaining good contact with the side pole 21 through the circular arc face 372.

To mount a pet guardrail 1 on the bottom end of an existing fence 2, as shown in FIG. 2, the pet guardrail 1 is attached to the existing fence 2 from one side of the bottom end, so that the embedding opening 30 of the upper crossbar 10 and the lower crossbar 11 can be embedded by the vertical bar 20, and a plurality of fastening bolts 31 are provided to fix the upper crossbar 10, the lower crossbar 11 and vertical bar 20. In this way, the pet guardrail 1 is fixed on one side of the existing fence 2 bottom and reduces the distance of the bottom of the existing fence 2 via the straight rod 13 installed between each two vertical bars 20. Then, push the upper wing plate 360 and the lower wing plate 361 of the rear cover plate 36 into the lateral openings 10*b*, 11*b* of the upper crossbar 10 and lower crossbar 11, so that the upper engaging lip 362 and the lower engaging lip 363 are respectively engaged and fixed by the upper engaging teeth 34*a*, 34*b* and the lower engaging teeth 35*a*, 35*b* and the rear cover 36 plate is fixed, meanwhile closing the literal openings 10*b*, 11*b* and finally, sheathing side cover 37 on the left and right ends of the upper crossbar 10 and the lower crossbar 11. In this way, the pet guardrail 1 is firmly fixed on the existing fence 2.

Moreover, the configuration of the circular arc surface 372 of the side cover 37 enables the side cover 37 to response to the installing inclination angle of the existing fence 2 suffering from the topographic influences. Through the circular arc surface 372 and the side pole 21 maintaining attached or avoiding to cause collision with the side pole 21, the installation is not limited.

It can be concluded from the above descriptions that mounting the present invention of a pet guardrail 1 on an existing fence 2 is easy and convenient. Through the present invention, the front covering plate disclosed in the first patent can be omitted. Moreover, the side caps can be maintained in contact with the side poles through the circular arc face to avoid collision with the side poles. Thus, the installation is not limited. The structure of the present invention is innovative and practical and meets the requirements for patent application. Therefore, an application is submitted herein. Your audit and approval will be highly appreciated.

What is claimed is:

1. A positioning device for fence supplemented with pet guardrail, the pet guardrail being fixed on one side of an existing fence via a positioning device in a manner of lateral attachment and embedding, the structure of the pet guardrail comprising at least an upper crossbar, a lower crossbar being arranged horizontally and a plurality of straight rods, the straight rods being connected between the upper crossbar and lower crossbar and fixed by an positioning peg, the upper crossbar and the lower crossbar facing one side of each vertical bar on the existing fence being configured with an embedding opening having an inner concave shape for embedding the vertical bar, and fixing the upper crossbar, the lower crossbar and the existing fence via a fastening bolt;

the positioning device further comprising an opposite outer side of the upper crossbar and the lower crossbar being respectively configured with an upper embedding slot and a lower embedding slot having a face-to-face opening and extending axially for respectively embedding the upper and lower ends of the straight rod and fixing with the straight rod via the positioning peg penetrating transversely from an inner side of the upper crossbar and lower crossbar, the sides of the upper crossbar and the lower crossbar facing the existing fence respectively having a lateral opening with an open shape, an opposite inner wall on the top end and the bottom end of the lateral opening respectively protruding with an upper engaging teeth and a lower engaging teeth extending axially; and a rear cover plate installed on the lateral opening, wherein the upper and lower ends of the rear cover plate facing the lateral opening respectively extending horizontally toward the ends of the upper crossbar and the lower crossbar to be an upper wing plate and a lower wing plate, the extending ends of the upper wing plate and lower wing plate respectively configured with an upper engaging lip and a lower catching lip facing in an opposition direction, and when the rear cover plate covering the lateral opening, the upper engaging lip and the lower engaging lip being respectively engaged fixedly with the upper engaging teeth and the lower engaging teeth.

2. The positioning device for fence supplemented with pet guardrail of claim 1, further including a side cover configured on the left and right ends of the upper crossbar and lower crossbar, and the side cover facing the end of a side pole of the existing fence having an circular arc surface.

3. The positioning device for fence supplemented with pet guardrail of claim 2, wherein the bottom end of the side cap comprising a lower opening, a side surface having a lateral opening, the bottom ends of the front side and the back side on the lower opening folded toward the inside of the lower opening to form a lower hook, and the side cover being sheathed from top to down and fixed on the outside of the left and right ends of the upper crossbar and lower crossbar.

4. The positioning device for fence supplemented with pet guardrail of claim 1, wherein the positioning peg and the fastening bolt are a screw bolt.

* * * * *